United States Patent

[11] 3,618,712

| [72] | Inventor | Robert Casey<br>Washington, Ill. |
|---|---|---|
| [21] | Appl. No. | 13,595 |
| [22] | Filed | Feb. 24, 1970 |
| [45] | Patented | Nov. 9, 1971 |
| [73] | Assignee | Caterpillar Tractor Co.<br>Peoria, Ill. |

[54] DIFFERENTIAL PINION BEARING LUBE PUMP
10 Claims, 1 Drawing Fig.

[52] U.S. Cl. .................................................. 184/6.28,
184/27 R, 308/207 S
[51] Int. Cl. .................................................... F16n 7/36
[50] Field of Search ............................................ 184/6, 6
TT, 6 Y, 11 R, 11 A, 27 R; 308/207 A

[56] References Cited
UNITED STATES PATENTS

| 1,506,888 | 9/1924 | Cross | 184/6 Y |
| 1,671,682 | 5/1928 | Norris | 308/207 A |
| 1,921,769 | 8/1933 | Morgan | 184/6 U |
| 2,053,542 | 9/1936 | Vandervoort | 184/6 U |
| 2,840,186 | 6/1958 | Nyland | 184/6 U |

*Primary Examiner*—Manual A. Antonakas
*Attorney*—Fryer, Tjensvold, Feix, Phillips & Lempio

ABSTRACT: Lubricating and cooling oil is supplied to the pinion bearings of a differential by means of a pump located within the differential housing. The pump is of the plunger operated variety and is driven from the differential case to pump the oil contained within the differential housing to the bearings.

PATENTED NOV 9 1971 3,618,712
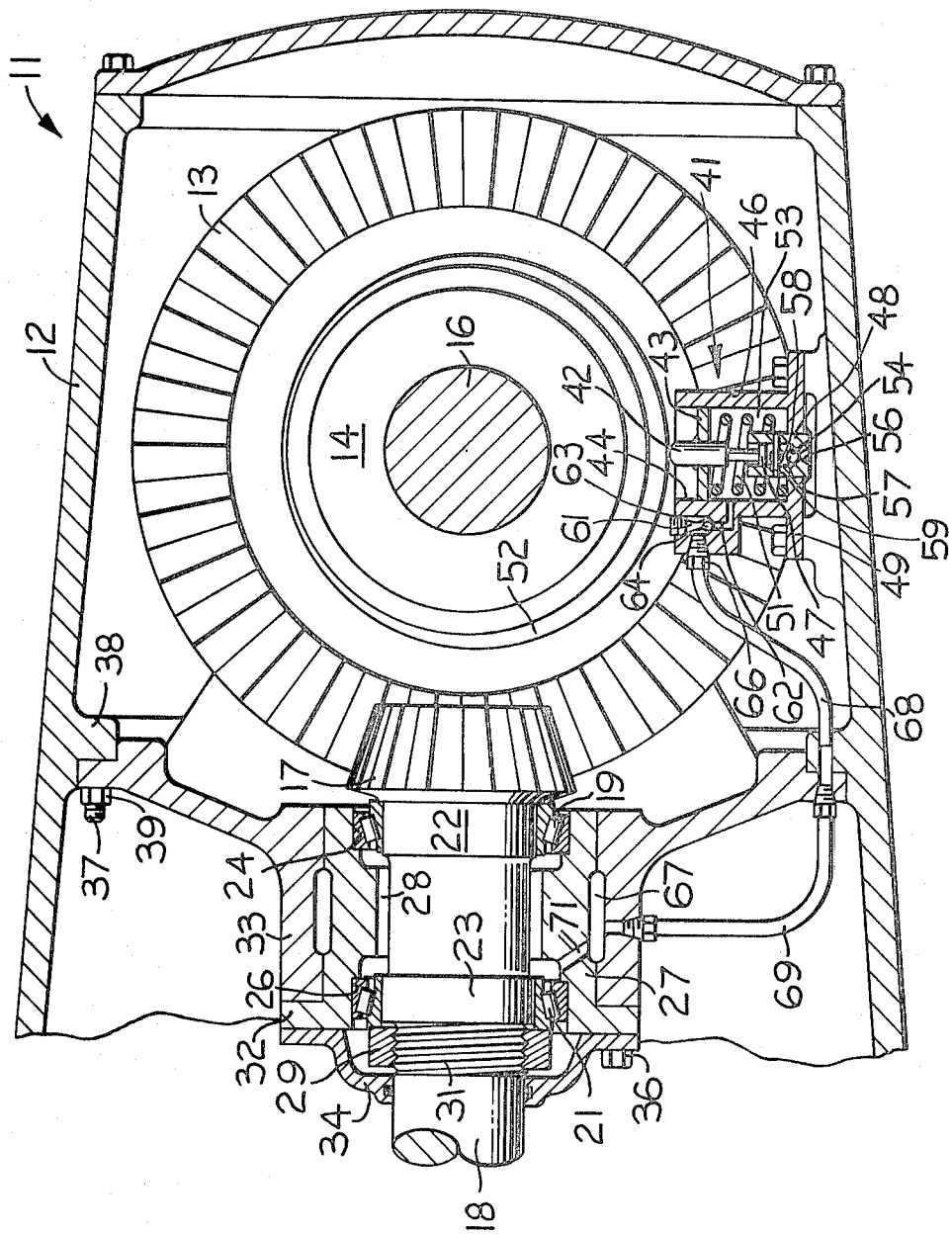
INVENTOR
ROBERT CASEY
BY
Fryer, Tjensvold, Feix, Phillips & Lempio
ATTORNEYS

DIFFERENTIAL PINION BEARING LUBE PUMP

BACKGROUND OF THE INVENTION

The bearings of a vehicular differential are conventionally lubricated by the oil spray centrifugally splashed by the rotating differential gears within the differential housing. Such a conventional splash lubrication system is inadequate under various circumstances, primarily since positive lubrication is not achieved under all conditions.

In some differential designs, for example, the differential pinion and its supporting bearings must be positioned at such an angle with respect to the housing that the outboard pinion bearing receives negligible splash lubrication and no lubrication by gravity feed. Moreover, the drive gearing may be such that the pinion rotates at very high r.p.m., in which case more than normal splash lubrication is required.

SUMMARY OF THE INVENTION the present invention relates to a system for providing positive lubrication of the pinion bearings of a vehicular differential under all design and operating conditions.

In accordance with the particularly salient aspects of the invention a lubrication system is provided which includes a pump submerged in the oil contained within a differential housing and arranged to be driven from the usual differential case rotatably mounted therein. Means are provided to establish a flow path between the outlet port of the pump and the inboard and outboard bearings rotatably supporting the differential pinion gear.

In response to rotation of the differential case in either direction corresponding to forward or reverse movement of a vehicle in which the differential is installed, the pump supplies oil from the differential housing via the flow path to the pinion bearings, oil return to the differential housing being facilitated by flow past the inboard bearing. The pump is driven at a rate proportional to the speed of the case rotation, and thus positive lubrication of the pinion bearings is achieved at all speeds in both the forward and reverse directions.

BRIEF DESCRIPTION OF THE DRAWING

The invention is illustrated in the accompanying drawing, wherein the single FIGURE is a side sectional view through a differential incorporating the differential pinion bearing lube pump system of the present invention

DETAILED DESCRIPTION OF A PREFERRED EMBODIMENT OF THE INVENTION

Referring now to the single FIGURE of the drawing, there is shown a vehicular differential 11 which includes a housing 12. Within the housing there is rotatably mounted a ring gear 13 having a differential case coaxially secured to an axle shaft 16. The ring gear is meshed with and driven by an angularly related pinion gear 17 disposed within the housing. The pinion gear is secured to a drive shaft 18 and rotatably mounted in position by means of inboard and outboard roller bearings 19 and 21 associated with the housing 12.

In the mounting of the pinion 17, the associated drive shaft 18 is formed with coaxially spaced-apart collars 22 and 23. The inner race members of the bearings 19 and 21 are respectively concentrically secured about the collars 22 and 23. The outer race members of the bearings are mounted in enlarged inwardly stepped portions 24 and 26 formed in the opposite ends of the bore wall of an annular bearing cage 27. As thus mounted, the bearings rotatably support the shaft coaxially of the cage with the shaft spaced radially inward from the cage bore wall. An annular cavity 28 is thus defined radially between the reduced portion of the shaft intermediate the collars 22 and 23 and the bore wall, which cavity terminates axially at the bearings 19 and 21. Proper preload of the bearings is maintained by means of a nut 29 concentrically engaged upon a threaded portion 31 of the shaft 18 outwardly adjacent the collar 23 with the nut bearing against the outboard bearing 21.

The forward end of the bearing cage 27 (left-hand end as viewed in the FIGURE is formed with an outwardly flared annular flange 32. The cage is concentrically mounted within an annular carrier 33 with the flange 32 coaxially interposed between a forward end face of the carrier and a cover 34 traversed by the shaft 18. Securance of the cover, cage, and carrier is facilitated as by means of bolts 36 traversing the cover and cage flange 32, and threadably engaging taps (not shown) provided in the carrier. The carrier is attached to the differential housing 12 as by means of stud bolts 37 projecting from an inwardly flared annular flange 38 thereof to traverse the carrier and threadably receive nuts 39.

With the components thus assembled it is to be noted that the inboard bearing 19 faces the housing interior. Splash lubrication of inboard bearing is effected by oil contained within the differential housing 12 being sprayed by the rotation of the differential gears 13 and 17. However, the outboard bearing 21 receives negligible splash lubrication. Consequently, splash lubrication, which is conventionally relied upon for pinion bearing lubrication in differentials, is inadequate under some conditions.

In some differential designs the pinion and its support bearings may be so positioned that, in addition to the splash lubrication of the outboard bearing being negligible, no gravity oil path exists between the bearings. Moreover, when the pinion rotates at a very high r.p.m., more than normal splash lubrication is required.

In order to obviate the foregoing difficulties encountered with the splash lubrication system conventionally employed in a differential, the present invention provides a lube pump system for positive lubrication of the differential pinion bearings under all conditions.

Basically, the lubrication system includes a pump 41 disposed within the differential housing, communicably connected to the pinion bearings 19 and 21, and driven from the ring gear differential case 14 to continuously pump oil contained within the housing to the bearings.

More particularly, the pump 41 is advantageously of the plunger operated type including a depressible plunger 42 to which is coaxially secured a piston 43 mounted for reciprocation coaxially within a cylinder bore 44 formed in a pump casing 46 mounted in the bottom of the differential housing 12 so as to be completely submerged in the oil contained therein.

The plunger includes a depending guide head 47 slidably disposed within a guide bushing 48 which extends through the base 49 of the casing 46 to project coaxially upward into the cylinder bore 44. A compression spring 51 is coaxially disposed about the bushing 48 to act between the base of the casing and piston and thereby normally resiliently maintain the piston and plunger in extended position.

The end of the plunger projecting from the cylinder gore 44 engages an eccentric cam 52 integrally formed with, or otherwise carried by the differential case 14 to alternately depress the plunger and piston, and permit extension thereof under the loading of the spring 51. THe piston 43 is thus reciprocated within a pump chamber 53 defined within the cylinder bore 44 between the piston and base 49 of the casing, in accordance with the rotation of the ring gear 13 in either the forward or reverse direction. In the illustrated case, the cam 52 effects one depression and extension stroke of the plunger and piston per revolution of the ring gear.

The pump 41 further includes valved inlet and outlet passages which are arranged to permit flow into the pump chamber 53 during the extension stroke of the piston 43, and flow out of the chamber during the depression stroke.

More particularly, the lower or exterior end of the bushing 48 is inwardly flared to define a valve seat 54 circumscribing an inlet port 56. A ball check valve 57 is supported upon the valve seat, and a radial opening 58 is provided in the side of the bushing at a point intermediate the valve seat and the plunger guide head 47 when it is at the lower reach of its stroke. The opening 58 facilitates communication between the bushing interior and the pump chamber 53.

A roll pin 59 is secured transversely of the bushing at a position spaced from the valve seat to limit displacement of the ball valve 57 therefrom. The foregoing components comprise the valved inlet passage of the pump.

The valved outlet passage of the pump is defined by a cavity 61 formed in the wall of the casing 46 with a duct extending from the pump chamber 53 to the base of the cavity to afford communication therebetween. The juncture between the duct and cavity is formed with a valve seat 63 for supporting a ball check valve 64. A fitting 66 defining an outlet port communicates with the cavity.

In order to provide a flow path for supplying oil from the pump 41 to the pinion bearings 19 and 21, an annular cavity 67 is preferably defined by facing circumferential grooves respectively formed in the outer periphery of the bearing cage 27 and the bore wall of the annular carrier 33. The cavity 67 is communicably connected to the pump outlet port fitting 66 by means of interconnected conduits 68 and 69, and at least one duct 71 is provided through the cage to communicably connect the cavity 67 to the cavity 28, preferably at a location immediately adjacent the outboard bearing 21.

In the operation of the differential pinion bearing lube pump system physically described hereinbefore, an extension stroke of the pump plunger 42 and piston 43 under the loading of spring 51 causes oil within the differential housing 12 to be drawn into the pump chamber 53, the valved inlet passage being at this time open to oil flow, and the valved outlet passage being closed.

More particularly, the extension stroke of the piston creates suction within the chamber 53 which displaces the ball check valve 57 from the seat 54 and sucks oil into the chamber through the open inlet port 56 and opening 58. The suction also acts to urge the ball check valve 64 against the valve seat 63 to thereby block communication between the chamber and the outlet cavity 61.

Conversely, a depression stroke of the pump plunger 42 and differential 43 against the loading of spring 51 compresses the oil previously drawn into the pump chamber 53 to thereby force the ball check valve 57 against the seat 54 and close the inlet port 56. At the same time the compression force displaces the ball check valve 64 from valve seat 63 to open communication between the pump chamber and outlet port fitting 66. The oil is thus pumped out of the chamber 53 through the fitting 66 and conduits 68 and 69 to the cavity 67, wherefrom the oil flows via duct 71 to the cavity 28 and lubricates both the inboard and outboard pinion bearings 19 and 21 in a positive manner. The oil supplied to the cavity 28 is returned to the differential housing by flow past the inboard bearing 19.

It will be appreciated that since the pump piston 43 is reciprocated by the action of the cam 52 carried by the differential case 14, the rate of reciprocation, and therefore the pumping speed, varies in accordance with the speed of rotation of the ring gear 13 and thus of the driving pinion gear 17. Adequate positive lubrication of the pinion bearings is consequently maintained at all differential gear speeds in both the forward and reverse directions.

Although the present invention has been hereinbefore described and illustrated in the accompanying drawing with the respect to a preferred embodiment thereof, numerous variations and changes may be made therein without departing from the true spirit and scope of the invention, and thus it is not intended to limit the invention except by the terms of the appended claims.

What is claimed is:

1. A lubrication system for a differential that includes a housing, a ring gear nd differential case rotatably mounted in the housing and being at least partially immersed in oil pooled in the bottom portion of said housing, a pinion gear meshing with the ring gear, said pinion gear having a shaft secured thereto rotatably supported by bearings spaced coaxially of the shaft and carried by the housing; said lubrication system comprising a positive-displacement pump disposed within the bottom portion of said housing and having an inlet port in direct communication with the oil contained within said housing, and an outlet port, eccentric means mounted directly on the ring gear mechanism and differential case for driving said pump from said ring gear mechanism in response to rotation thereof to pump said oil into said inlet port and out of said outlet port, and means defining a flow path between said outlet port and said bearings to deliver oil pumped out of said outlet port to said bearings and thereby positively lubricate same.

2. A lubrication system according to claim 1, further defined by said pump being a plunger operated pump including an operating plunger projecting from a pump casing, said eccentric means for driving the pump comprising a cam carried by said differential case of said ring gear and engaging said plunger.

3. A lubrication system according to claim 2, further defined by said plunger operated pump comprising a piston coaxially secured to said plunger and mounted for reciprocation coaxially of a cylinder bore formed in said casing, resilient means disposed within said bore and acting between a base of said casing and said piston to normally resiliently maintain said piston and plunger in an extended position, said cam thereby alternately depressing said plunger and piston and permitting extension thereof under the loading of said resilient means, said piston and base of said casing axially defining a pump chamber within said bore, means including said inlet port defining a valved inlet passage to said pump chamber, and means including said outlet port defining a valved outlet passage from said pump chamber, said valved inlet and outlet passages being operable to permit flow to said pump chamber through said inlet passage during an extension stroke of said piston and flow from said pump chamber through said outlet passage during a depression stroke of said piston.

4. A lubrication system according to claim 3, further defined by said means defining a valved inlet passage comprising a guide bushing extending through said base of said casing and projecting coaxially into said cylinder bore, said bushing slidably coaxially receiving a depending guide head of said plunger, said bushing inwardly flared at its exterior end to define a valve seat circumscribing an opening defining said inlet port, said bushing having an opening communicating the interior of said bushing with said pump chamber, and a check valve supported upon said valve seat, and said means defining a valved outlet passage comprising means defining an outlet cavity within said casing and a communicating duct extending from said pump chamber to said cavity, the juncture between said duct and said cavity formed with a second valve seat, means defining an opening extending exteriorly of said cavity to define said outlet port, and a second check valve supported upon said second valve seat.

5. A lubrication system according to claim 10, further defined by said means defining a flow path comprising an annular bearing cage, an annular carrier secured to said housing and concentrically mounting said cage, said carrier and cage defining an annular cavity therebetween, means mounting said bearings coaxially within the bore of said cage with the portion of said shaft between said bearings spaced radially inward from the wall of said cage bore to thereby define therewith an annular cavity coaxially between said bearings, said inboard bearing disposed to face the interior of said housing, said cage having at least one duct communicating said cavity between said bearings, and conduit means connecting said pump outlet port to said cavity between said cage and carrier.

6. A lubrication system according to claim 5, further defined by said duct terminating in said cavity coaxially between said bearings at a location adjacent the furthest outboard bearing.

7. A lubrication system according to claim 5, further defined by said pump being a plunger operated pump including an operating plunger projecting from a pump casing, said means for driving the pump comprising a cam carried by said differential case and engaging said plunger.

8. A lubrication system according to claim 7, further defined by said plunger operated pump comprising a piston coaxially secured to said plunger and mounted for reciprocation coaxially of a cylinder bore formed in said casing, resilient means disposed within said bore and acting between a base of said casing and said piston to normally resiliently maintain said piston and plunger in an extended position, said cam thereby alternately depressing said plunger and piston and permitting extension thereof under the loading of said resilient means, said piston and base of said casing axially defining a pump chamber within said bore, means including said inlet port defining a valved inlet passage to said pump chamber, and means including said outlet port defining a valved outlet passage from said pump chamber, said valved inlet and outlet passages being operable to permit flow to said pump chamber through said inlet passage during an extension stroke of said piston and flow from said pump chamber through said outlet passage during a depression stroke of said piston.

9. A lubrication system according to claim 8, further defined by said means defining a valved inlet passage comprising a guide bushing extending through said base of said casing and projecting coaxially into said cylinder bore, said bushing slidably coaxially receiving a depending guide head of said plunger, said bushing inwardly flared at its exterior end to define a valve seat circumscribing an opening defining said inlet port, said bushing having an opening communicating the interior of sad bushing with said pump chamber, and a check valve supported upon said valve seat, and said means defining a valved outlet passage comprising means defining an outlet cavity within said casing and a communicating duct extending from said pump chamber to said cavity, the juncture between said duct and said cavity formed with a second valve seat, means defining an opening extending exteriorly of said cavity to define said outlet port, and a second check valve supported upon said second valve seat.

10. The lubrication system of claim 1, wherein said eccentric means operates said pump regardless of the direction in which said ring gear mechanism and differential case rotate.

* * * * *